(12) United States Patent  
Prendiville et al.

(10) Patent No.: US 6,634,283 B2
(45) Date of Patent: Oct. 21, 2003

(54) SKIN LOOSENING OR REMOVAL APPARATUS

(75) Inventors: John Edward Legge Prendiville, London (GB); Malcolm Louis Axel Avison, East Sussex (GB)

(73) Assignee: James Foxdale Limited, South Wirrall (GB)

( * ) Notice: Subject to any disclaimer, the term of this patent is extended or adjusted under 35 U.S.C. 154(b) by 0 days.

(21) Appl. No.: 09/944,215

(22) Filed: Sep. 4, 2001

(65) Prior Publication Data

US 2002/0031584 A1 Mar. 14, 2002

Related U.S. Application Data

(60) Division of application No. 09/059,044, filed on Apr. 13, 1998, now Pat. No. 6,284,300, which is a continuation-in-part of application No. 08/451,073, filed on May 25, 1995, now Pat. No. 5,738,894, which is a continuation-in-part of application No. PCT/GB94/02539, filed on Nov. 18, 1994.

(30) Foreign Application Priority Data

Nov. 19, 1993 (GB) .............................................. 9323844

(51) Int. Cl.$^7$ .............................. A23N 5/00; A47J 43/00
(52) U.S. Cl. .............................. 99/570; 99/571; 99/612
(58) Field of Search .......................... 99/568, 570, 571, 99/600, 609, 612

(56) References Cited

U.S. PATENT DOCUMENTS

| 1,367,664 | A | | 2/1921 | Kennedy |
| 1,717,647 | A | | 6/1929 | Barody |
| 1,887,256 | A | | 11/1932 | Bizzell et al. |
| 2,329,403 | A | | 9/1943 | Logue |
| 2,651,345 | A | | 9/1953 | Schoolcraft |
| 3,077,217 | A | | 2/1963 | Hind |
| 3,859,907 | A | * | 1/1975 | Hatcher ........................ 99/570 |
| 3,877,362 | A | * | 4/1975 | Epstein et al. ................. 99/570 |
| 4,082,856 | A | * | 4/1978 | Zwiep et al. .............. 99/570 X |
| 4,082,867 | A | | 4/1978 | Henley et al. |
| 4,300,447 | A | | 11/1981 | Hoover |
| 4,537,122 | A | | 8/1985 | George |
| 4,738,860 | A | | 4/1988 | Lee |
| 4,785,729 | A | | 11/1988 | Latreyte |
| 4,996,917 | A | | 3/1991 | Burlock et al. |

FOREIGN PATENT DOCUMENTS

| DE | 39 14 355 | 11/1987 |
| EP | 43 324 | 1/1982 |
| FR | 2 638 948 | 11/1988 |
| FR | 2 663 512 | 6/1990 |
| GB | 1190522 | 5/1970 |
| JP | 61-21079 | 1/1986 |
| JP | 2-60580 | 3/1990 |
| JP | 4-26830 | 4/1992 |
| YU | 113/83 | 7/1984 |

* cited by examiner

*Primary Examiner*—Reginald L. Alexander
(74) *Attorney, Agent, or Firm*—Bacon & Thomas, PLLC

(57) ABSTRACT

Apparatus for loosening or removing the skin from products such as nut kernels, beans, seeds or the like. Carriers are arranged to receive the products and a liquid jet manifold is adapted to direct jet or jets at the products. In a preferred embodiment, the products are disposed in an annular recess in a carrier, and are subjected to jets of liquid discharged from two nozzles at each end of a bar arranged to rotate above the recess.

7 Claims, 12 Drawing Sheets

SKIN LOOSENING OR REMOVAL APPARATUS

CROSS-REFERENCE TO RELATED APPLICATIONS

This application is a divisional of Ser. No. 09/059,044, filed on Apr. 13, 1998, now U.S. Pat. No. 6,284,300 (subject to a Terminal Disclaimer) which is a continuation-in-part of Ser. No. 08/451,073, filed on May 25, 1995, now U.S. Pat. No. 5,738,894, which is a continuation-in-Part of International Patent Application No. PCT/GB94/02539 designating the USA and published in English with an international filing date of Nov. 18, 1994.

BACKGROUND OF THE INVENTION

1. Field of the Invention

The present invention relates to apparatus for loosening or removing the skins from products such as nut kernels, beans, seeds or the like.

2. Related Art

Various devices employing different techniques are known for removing the skins from such products.

With particular reference to nut kernels, devices are known which scrub, brush or scrape the nut kernels, or use other abrasive type treatments to remove the nut kernel skins. In certain cases, 40% of the treated products still have their skins adhered thereto. It is then necessary electro-optically or manually to sort the products and re-treat those on which the skins remain.

In most cases, prior to employing the above skin removing processes, the nuts are pre-treated to loosen the skins for their more efficient removal. Typically pre-treatment involves soaking the nut kernels in water or a suitable aqueous solution. Alternatively the pre-treatment may take the form of roasting the kernels or heating them in hot air, steam, water or an aqueous solution.

The speed and efficiency at which nuts can be processed in these known methods of skinning is reduced by the additional pre-treatment process steps involved. Although necessary in order to attain skinned nuts of the required quality, these pre-treatment steps may thus be undesirable since they add time to the skinning operation as a whole. The apparatus required for such pre-treatments moreover usually involve considerable extra plant investment costs and maintenance costs.

Particular forms of pre-treatment also have their particular associated problems. For example, with treatments that involve a nut kernel being heated, the heat so applied can cause damage to the kernel's cell structure, reducing its shelf life and affecting its flavour characteristics. Also, when heating the nut kernel has only been partially successful in loosening the kernel skin, repeating is not desirable due to the likelihood of damage.

Soaking forms of pre-treatment have the disadvantage that they are typically highly time consuming. In one known process for example, nut kernels are soaked in water or sodium hydroxide for about eight hours. Since all the nut kernels have to pass through the soaking step before they are skinned, the output of the skinning process will depend on the amount of nuts which can be soaked at any given time. Soaking in chemical solutions requires careful monitoring in order to ensure that the nut kernels are themselves not damaged by the action of the solution.

It has been proposed in U.S. Pat. No. 4,537,122 to skin almond nuts by fluidising a bed of nuts with air. In this system, the nuts are first presoaked and washed to remove 90–95% of their skins and the remaining 5–10% is removed by the fluidising air. Thus several steps are involved.

It has been proposed in U.S. Pat. No. 4,300,447 to skin peanuts by the abrasive action of a rotating cylinder in combination with jets of air. Again, in this proposal, it is preferred for the raw peanuts to be preconditioned by warm or hot air or hot water or aqueous solution. A significant proportion of the nuts may remain unskinned without such pre-treatment.

It has been proposed in U.S. Pat. No. 2,651,345 to provide a machine which uses water jets as part of a process to remove the skins from hazelnuts. The nuts are contained in a series of parallel elongate chambers where they are supported on rotating rolls having spiral ridges for conveying the nuts along the chambers whilst being subjected to jets of water discharged from fixed nozzles. The rolls form a moving floor of each chamber and the jets are angled to strike the nuts with "glancing blows" when the nuts are positioned centrally at the lowermost region of the chamber, between the rolls. In order to be sure that there are no nuts above a correctly positioned nut, which would shield that nut from the jets, each nut must effectively be conveyed individually along a chamber during the skinning process and this is inefficient in terms of production rates. The machine is complicated in that the rotating rolls have to be provided and in that the jets of water have to be carefully aimed to provide the desired glancing blows. In addition, the rotation of the nuts on the rolls demands, in the main, uniformly spherical and uniformly sized nuts, thereby limiting the types and varieties which can be used in the machine. For example, certain types of hazelnut are "acorn" or "cone" shaped and will not readily turn on the rolls.

A similar rotating roll conveyance system for nuts has been proposed in U.S. Pat. No. 3,077,217. Thus, in this proposal there are also fixed nozzles directing a spray into an elongate chamber having a floor formed by a pair of adjacent rotating rolls, the nuts being conveyed substantially individually along the chamber by a helical groove on one of the rolls. The other roll has an abrasive surface for removing the nut skins, assisted by a hot water spray (140° F. to 175° F.) at a pressure of 40 psi to 80 psi. Because of the need to abrade the nuts at the floor of the chamber, the nuts have to be conveyed individually along the chamber and there are again limitations in production rates and the ability to deal with products of different shape and size.

It has been proposed in U.S. Pat. No. 4,738,860 to provide a machine concerned exclusively with walnuts. The walnuts are subjected to water jets, at a preferred pressure ranging from 30 psi to 100 psi, but this does not itself remove the skins. During spraying the walnuts are contained in cup shaped containment areas formed by a fine mesh fabric net or screen. Although the document suggests that the walnuts can move freely within the containment area during spraying, there will be a tendency, if more than one layer of walnuts are put in the containment area, for there to be a "dead" region at the bottom of the cup-shape where walnuts will remain and thus not be exposed directly to the spray. It will therefore be generally necessary to load the containment area with only one layer of walnuts and this will again impose a limitation on production rates.

Further concerning U.S. Pat. No. 4,738,860, following the application of water jets, the skinned walnuts and the skins are taken together to a centrifuge and thereafter the skins and the nut meat are separated by means of an air blower. The process therefore requires an additional step to remove the skins from the skinned nuts.

BRIEF SUMMARY OF THE INVENTION

According to the present invention there is provided apparatus for removing the skin from products such as nut kernels, beans, seeds or the like, comprising receiving means arranged to receive a plurality of the products in a body thereof with the products in contact with each other, the receiving means having liquid outlet means, and liquid discharge means adapted to direct a jet or jets of liquid at the products so as to remove their skins, whereby the skins removed from the products are carried away from the skinned products by said liquid and via said outlet means of the receiving means.

The action of the jet or jets of liquid loosens and removes the skins whilst in addition creating movement of the products which allows the skins to escape. The liquid serves to carry away the removed skins. The combination of the liquid action and abrasion between the products provides a very efficient process in which the skins of a large number of products may be simultaneously removed from the skinned products and carried away therefrom. The time taken to remove the skins is relatively short, for example of the order of 90 seconds for Oregon hazelnuts and of 35 seconds for Turkish hazelnuts.

Preferably, the products are not pre-treated before being subjected to the jet or jets of liquid. Thus for example raw products, such as hazelnut kernels, may be subjected to the jet or jets of liquid. This saves expense and time in the production process, and preheating or presoaking, and the use of chemicals or even water in a pre-treatment step or steps, can be avoided. However, there are some products which benefit from pre-treatment. For example, almonds can be scalded for a short period of time (such as 10 seconds) and then subjected to the jet or jets of liquid. This is a considerable reduction from the usual two minute scalding time applied to almonds to loosen their skins prior to removal by pinch rollers. There is therefore an improvement in the efficiency of the process in that a reduced pre-treatment time is involved. Moreover, there will be less moisture increase during the combined scalding and skinning steps than during the usual more lengthy scalding step, leading to a shorter or cooler drying step and thus savings in time and energy and maintenance of oil, flavour and colour characteristics of the products.

In the preferred embodiments, the liquid used is water, a readily and cheaply available product.

The or each jet may be produced by discharging the liquid through a liquid discharge means, such as a nozzle. The nozzle is preferably such as to produce a so-called flat-spray jet. This is a jet which diverges from the nozzle at an angle and in cross-section (perpendicular to the flow direction) has the shape of an ellipse with the major axis considerably greater than the minor axis. The divergence angle may be very small, thereby concentrating the effect of the jet over a small area, but increased coverage is obtained with a wider jet which is able to impact against a larger number of products simultaneously. Thus the nozzles may be such as to produce a flat-spray jet with spray angles of, for example, 15°, 25°, 40°, 65°, 80°, 95° or 110°. Suitable nozzles are supplied by Lurmark Limited, of Longstanton, Cambridge, England and a particularly effective nozzle made by that company is model B2CM02E15, which produces a 15° flat-spray jet.

The required pressure of the liquid will depend on the products to be skinned and the shape of the jet or jets. The liquid may be pressurised at a pressure in the range of 35 psi (pounds per square inch) to 600 psi, although high pressures, up to 2000 psi or even 5000 psi may be appropriate for some products. Preferred pressure ranges are 80 psi to 600 psi, 150 psi to 600 psi, 200 psi to 600 psi, 250 psi to 600 psi, 300 psi to 600 psi, 350 psi to 600 psi, and 400 psi to 600 psi. Other preferred ranges are 200 psi to 500 psi, more preferably 300 psi to 500 psi. In a preferred process involving the skinning of hazelnut kernels, a pressure of 450 psi to 500 psi, e.g. 475 psi, has proved very effective.

Lower pressures may be effective with a narrow spray angle (since spray impact is greater with narrower spray angles at a similar flow rate) and/or with the jet being generated by discharge means in close proximity to the products, whilst higher pressures may be required with a wide spray angle and/or with the jet being generated further away from the products.

The pressurisation of the liquid will normally be generated by a pressure source such as a pump. Reciprocating pumps are preferred, although other pumps may also be used. Where several jet discharge means are used, the pressure source will need to be of sufficient capacity to maintain an adequate pressure supply to all the discharge means. It may be desirable to use more than one pressure source.

Liquid flow rates will vary depending on the pressures used and the size of the nozzle. Flow rates may vary for example in a range of 5 to 12 liters per minute per nozzle.

For some products, heat may be used if it is beneficial, but in view of the effectiveness of the process heat is not generally necessary. Preferably, therefore, no heat is used in the process; in other words, the liquid used is at ambient temperature. This saves on energy costs. Moreover, the cell structure of the product is unchanged, thereby making it possible to return for reprocessing any products with skin still adhering to their surface. However, in view of the efficiency of the skin removal process, it will generally be necessary to repeat the method on only a small proportion of the products, if any.

It is desirable that over a period of time all the products in the receiving means are exposed directly to the jet or jets of liquid. Preferably, therefore, the receiving means is configured such that in response to liquid jetting, products disposed in a lowermost region of the body of products are caused to move to an upper region of the body of products, in which upper region they are exposed directly to the jet or jets of liquid. Such an arrangement is of independent patentable significance, both in the context of a system for removing product skins and a system for loosening them prior to final removal by other known means, e.g. pinch rollers.

Viewed from a further aspect, therefore, the invention provides a process of loosening or removing the skin from products such as nut kernels, beans, seeds or the like, the process comprising receiving in receiving means a plurality of products in a body thereof, subjecting the products to a jet or jets of liquid directed at the body of products from above so as to loosen or remove the skins of the products, and causing, by the configuration of the receiving means and in response to the liquid jetting, products disposed in a lowermost region of the body of products to move to an upper region of the body of products, in which upper region they are exposed directly to the jet or jets of liquid.

Viewed from another aspect the invention provides apparatus for loosening or removing the skin from products such as nut kernels, beans, seeds or the like, the apparatus comprising receiving means for receiving a plurality of products in a body thereof, and liquid discharge means for directing a jet or jets of liquid at the body of products from above so as to loosen or remove their skins, wherein the receiving means is configured such that, in response to liquid jetting, products disposed in a lowermost region of the body of products are caused to move to an upper region of the body of products, in which upper region they are exposed directly to the jet or jets of liquid.

Viewed from another aspect the invention provides a receiving means for receiving a plurality of products such as nut kernels, beans, seeds or the like, the receiving means being adapted to receive the plurality of products in a body thereof and to have a jet or jets of liquid directed at the body of products from above so as to loosen or remove the skins of the products, the receiving means being configured such that, in response to liquid jetting, products disposed in a lowermost region of the body of products are caused to move to an upper region of the body of products, in which upper region they are exposed directly to the jet or jets of liquid.

The configuration of the receiving means thus causes any products disposed in the lowermost region of the body thereof, where they may not be adequately exposed to the jet or jets of liquid, to move to an upper region where they are exposed directly to the jet or jets. This can ensure efficient skin loosening or removal, even with the products in a body comprising more than one layer of products. A relatively large quantity of products can thus be processed for a given area covered by the jet or jets of liquid.

Products in the upper region will generally fall under gravity to a lower position and then be recycled back to the upper region. A tumbling process can be achieved in which each individual product is repeatedly exposed to the jet or jets. This will tend to result in a different part of each product being presented to the jet or jets on each exposure, whereby substantially all surfaces of the products in the receiving means are exposed over a period of time.

In a preferred arrangement, the configuration of a stationary portion, e.g. a floor, of the receiving means can be such as to achieve the desired product movement. This is beneficial as compared to rotating rolls which require a drive mechanism and may cause undesirable excessive abrasion of the products.

The receiving means preferably has a plurality of upwardly sloping portions to cause or promote upward movement of the products. Such upwardly sloping portions, which may for example be in the form of ridges or ramps, can assist both in helping the products to move upwardly from the lowermost region and in achieving the tumbling motion of the products which is desirable for their various surfaces to be exposed to liquid jetting.

It is desirable to impart lateral movement to the products. If there are upwardly sloping portions, lateral movement of the products will bring them into contact with the upwardly sloping portions and hence cause the products to move upwardly. Thus, in use of a preferred embodiment, a given product will follow a generally lateral path as viewed in plan, and will move up and down as it moves along this path. Each upward movement will be caused by a respective upwardly sloping portion, and the product will then tend to drop down again. Preferably, the lateral movement of the products is along a path in the form of an endless loop. The process can therefore continue for as long as is desired whilst maintaining continuous movement of the products.

The lateral path of movement of the products can be achieved by providing the jet or jets with a horizontal component. Another way of causing or aiding lateral product movement is to provide the receiving means with a plurality of channel portions which slope downwardly in a direction to cause liquid to flow in that direction. Such a flow can act on the products and promote their lateral movement in the direction of liquid flow. Each channel portion is preferably defined by two adjacent ridges which form upwardly sloping portions.

The process may be operated such that substantially no liquid is retained in the receiving means.

Preferably, however, the process comprises retaining an amount of liquid in the receiving means, for example up to one third of the height of the receiving means, and causing the retained liquid to flow laterally in the receiving means. This flow will assist lateral movement of the products. It can be caused by a horizontal component of the jet or jets, and/or by sloping channel portions feeding liquid into the body of retained liquid. Maintenance of a certain amount of liquid in the receiving means may be effected by appropriate sizing of liquid outlet means having regard to the rate of liquid input from the jet or jets.

If the upwardly sloping portions are in the form of a plurality of ridges, these may be arranged generally parallel to each other in a row. Preferably, however, they extend outwardly from a central region. Over a period of time, a product will move round the central region and return to its starting point.

The receiving means will in general be configured such that there are no "dead" regions where the products can rest without movement. In a preferred embodiment the receiving means has a central region blocked off to prevent the products from going there. This will be particularly advantageous if the area covered by the jet or jets is generally ring-shaped or annular, because the products will not be able to go to the center of the ring.

With certain products, such as almonds, the skins may in some circumstances be loosened but not entirely removed by the liquid jet-or jets. With other products, such as hazelnuts, the skins are removed. Preferably, therefore the liquid outlet means are large enough for skins removed from the products to be carried away from the skinned products by the liquid, but small enough not to allow escape of the skinned products. A plurality of round holes or elongate slots may be provided. An advantage of an elongate slot is that removed skins tend to be "leaf" shaped and can thus be carried by a flow of liquid through a relatively narrow slot.

The receiving means is preferably made of a substantially smooth material, to minimise abrasion between the receiving means and the products which could lead to lost weight and pitting. The rough effect created by the wires of a mesh material is thus less preferred for many products. A preferred material is polycarbonate, although other materials are of course suitable.

The liquid discharge means may be fixed above the receiving means. It may then be desired to move the receiving means to achieve relative movement between it and the liquid discharge means. Preferably, however, the receiving means is stationary during liquid jetting and the position of the liquid discharge means of the jet or jets is moved. The liquid discharge means is preferably coupled to a driving mechanism, although in some circumstances such a mechanism is not required if the liquid discharge means is arranged so as to be movable relative to the receiving means in response to the reaction force generated by the liquid discharged. In a preferred embodiment, a driving mechanism, e.g. an electric motor, is provided to drive the liquid discharge means and is assisted by the reaction force of the liquid discharged.

In a preferred embodiment the liquid discharge means is provided vertically above the products and the movement occurs in a horizontal plane. Providing the jet or jets vertically above the products makes the process easier to carry out, as the products can simply be disposed in an open-topped container and retained therein by gravity, with the jets being directed at the products through the open top of the container.

In a particularly preferred embodiment, the liquid discharge means is rotatably movable. The rotatable arrangement of the discharge means can be achieved in various ways. Preferably, the liquid discharge means comprises a pair of nozzles, each nozzle being attached to one of the two ends of a rotatable support, the support being disposed above the receiving means, and the support being arranged to rotate above the receiving means.

Providing two nozzles at the ends of a rotatable support allows the forces exerted on the nozzles by the jets of liquid being discharged therefrom to be balanced, so that there is little or no resultant force on the support or its mounting. The forces will however form a couple tending to make the bar rotate.

Further, providing two nozzles means that there are two jets of liquid impacting on the products rather than just one, which results in an increased frequency of impact and hence a reduced processing time.

The direction in which the liquid discharge means is oriented may be vertical or near vertical. It is preferred that the direction of discharge of each nozzle is between 0° and 20° to the vertical, e.g. 9°.

Although the discussion above has referred to receiving means and liquid discharge means in the singular, it will be appreciated that a plurality of receiving means can be provided, each one having e.g. a pair of nozzles disposed above it, to increase the amount of product that can be processed at any one time.

The spacing of the jet discharge means from the body of the products may be chosen according to the particular products, the pressure used, the spray-angle etc. A spacing not greater than 6 inches is preferred, and a spacing in the range of 1–3 inches is particularly preferred.

Preferably the spacing between the discharge means of the jet or jets of liquid and the body of products is adjustable. This may be advantageous if the same apparatus is to be used for different products.

It is possible to load the receiving means with products at a product loading station where skin loosening or removal is also carried out, either by arranging the jet discharge means to be permanently located at the loading station or to be movable to the loading station after loading. It is however preferred for the receiving means to be movable from a product loading station to a skin loosening or removal station. Unloading of the processed products may also be carried out at the same station as loading and processing, but again it is preferred for the receiving means to be movable from the skin loosening or removal station to a product unloading station.

Movement of the receiving means between the stations may for example be effected by sliding or rolling of the receiving means on tracks, rails or the like. Return of the receiving means after unloading to the loading station may be effected manually or by appropriate conveying means. For example, the receiving means may be mounted on a chain conveyor, whereby the receiving means follows a forward, upwardly facing path and a return, downwardly facing path.

Loading of the receiving means may be carried out manually or by known hopper and product dosing arrangements. Unloading may be carried out manually or by known tipping mechanisms, suitably adapted if necessary. If a chain conveyor as mentioned above is used, tipping is effected automatically.

The receiving means advantageously encloses the products to prevent them from escaping during skin removal, whilst of course permitting the removed skins to be carried away. The receiving means may therefore have a lid which is closed after loading. Preferably, the receiving means is open-topped at the product loading station and a lid for the receiving means is provided at the skin removal station. This is particularly convenient, since in a process involving several receiving means only one lid needs to be provided. The lid will of course be such as to allow entry of the jet or jets to the receiving means.

Following skin removal, the products can be dried. This can be carried out for example using known dehumidification equipment. It will generally be desirable to dry the products at air temperatures below about 45° C., preferably about 40° C., so as to avoid heating of the products which would tend to reduce their shelf life.

BRIEF DESCRIPTION OF THE DRAWINGS

Preferred embodiments of the present invention will now be described by way of example and with reference to the accompanying drawings, wherein.

DETAILED DESCRIPTION OF PREFERRED EMBODIMENTS OF THE INVENTION

Figure 1:
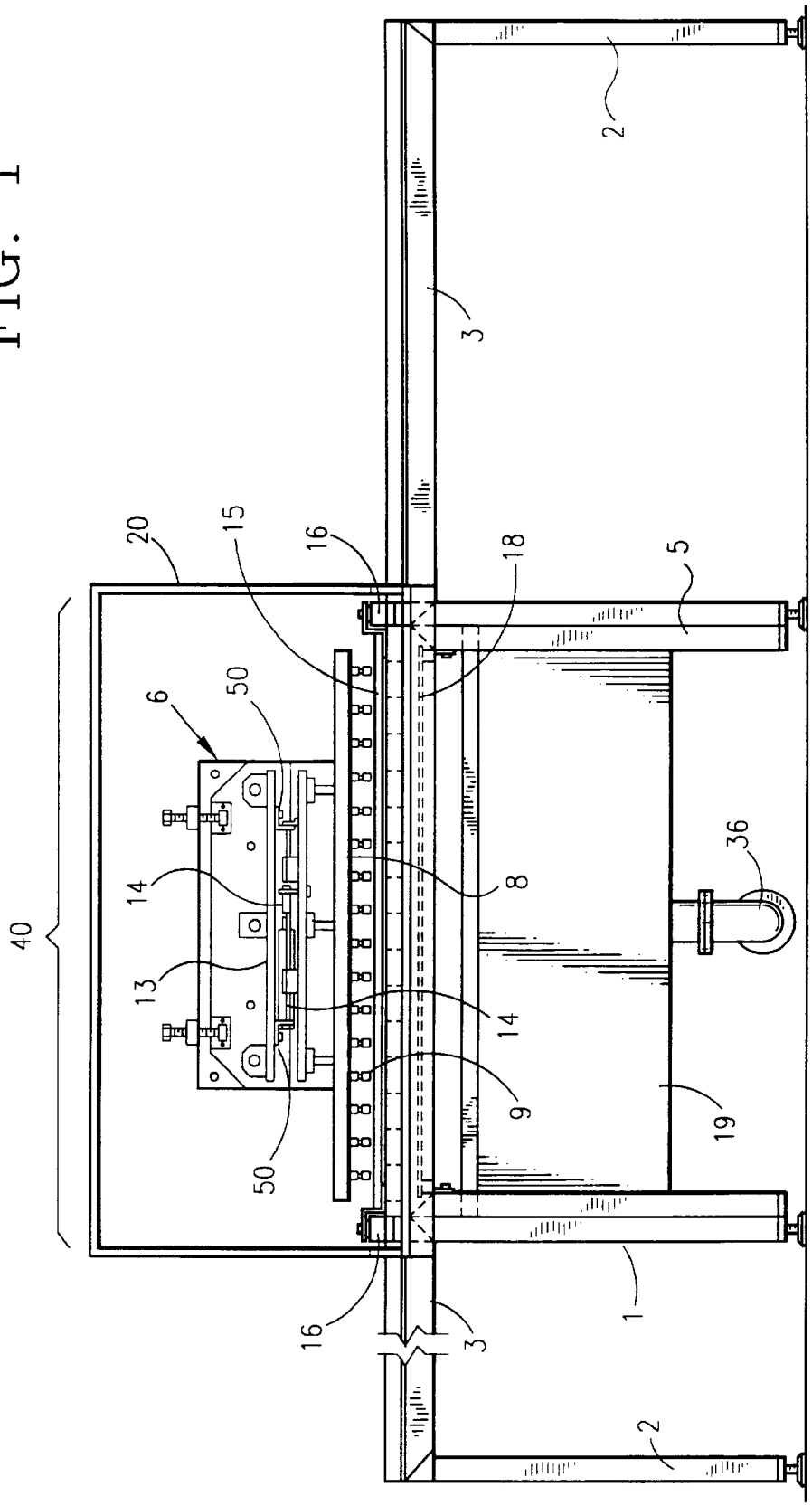
FIG. 1 shows a front elevation of apparatus in accordance with a first embodiment of the present invention.

According to a first embodiment, the apparatus comprises a main frame 1 having four pairs of support legs 2, a platform 3 supported by the legs and receiving four product trays 30 made up of product receiving means in the form of cages 4, and a centre frame 5 mounted between the two pairs of centrally positioned legs and 10 supporting thereon a water supply mechanism 6. The water supply mechanism is arranged above a product processing area 40 defined centrally of the platform 3.

The frame and tray components are made from stainless steel for its anti-corrosive properties although alternative materials such as other suitable metals or plastics may be used.

Figure 4:
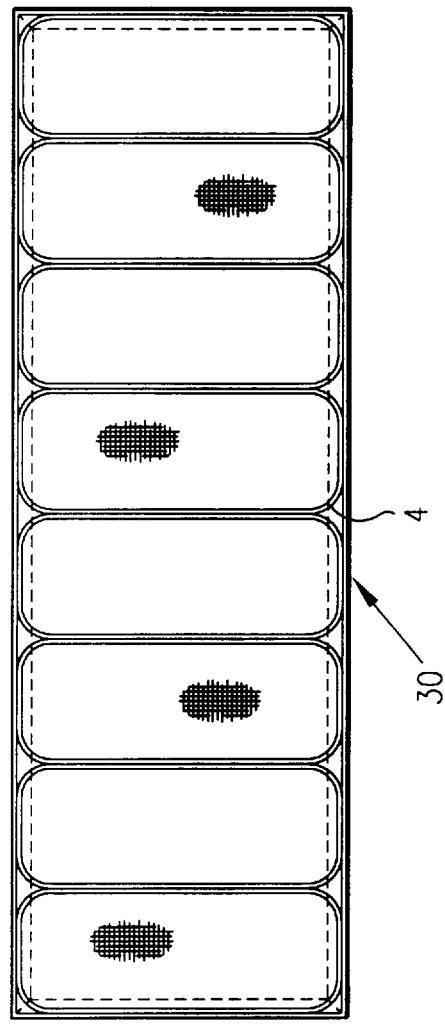
FIG. 4 shows in plan view a tray of cages suitable for use in the first embodiment, to a larger scale.

As seen in FIG. 4, each product tray 30 comprises eight cages arranged in a row. Any suitable number of cages may be used, joined together or separate. Two pairs of product trays 30 are provided, the trays of each pair being arranged side by side. The trays are slidably received on rails 7 which extend along the length of the apparatus and which allow the trays to be moved into and out of the processing area 40 below the water supply mechanism 6 via both ends of the apparatus.

As shown in FIG. 1, a lid 15 is provided for the trays, which extends along the trays when located in the processing area 40 and which can be lowered, by means of pneumatically driven pistons 16, into place on top of the cages 4 to prevent any products escaping from the top of the cages during the skinning process. The lid 15 is formed with holes to allow jets of water from the water supply mechanism 6 to reach the products.

The water supply mechanism 6 includes a manifold 8 which distributes water to sixteen pairs of laterally spaced nozzles 9. Each cage 4 is thus provided with a nozzle above it.

Figure 2:
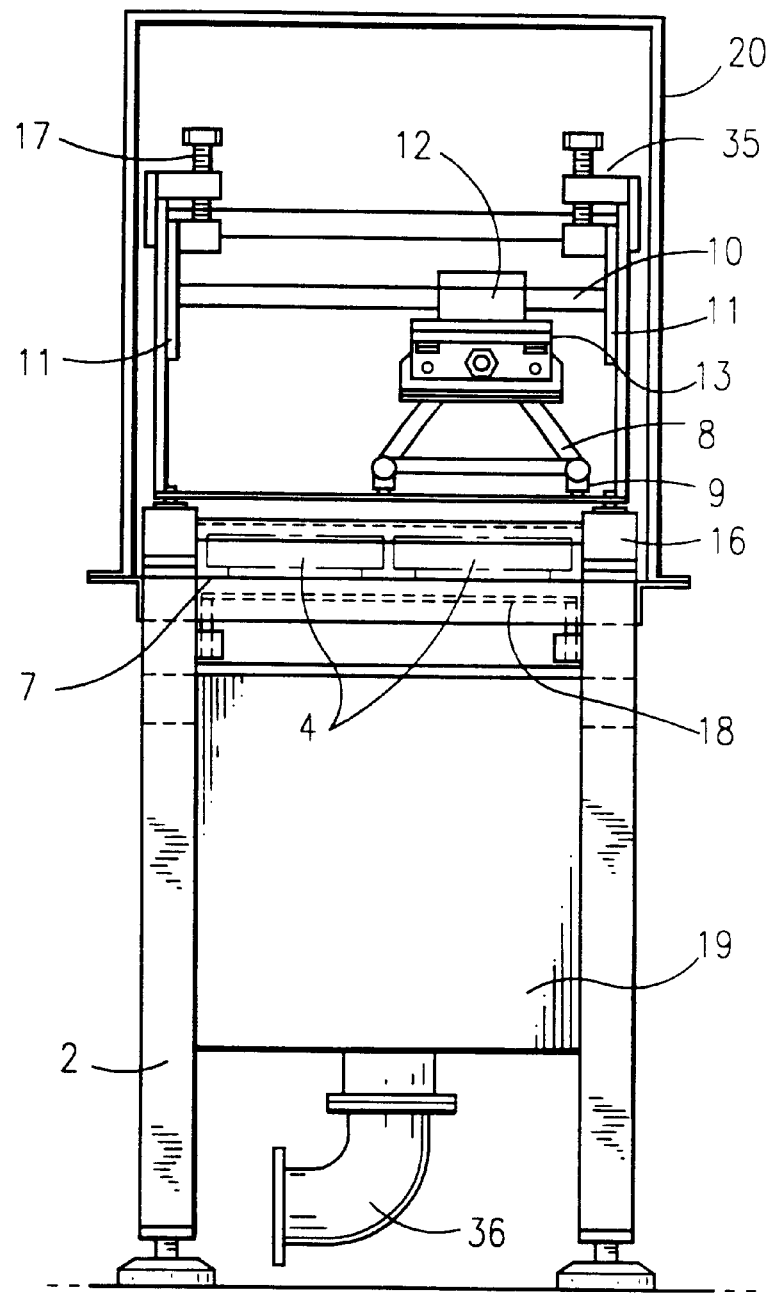
FIG. 2 shows an end elevation of the first embodiment.
Figure 3:
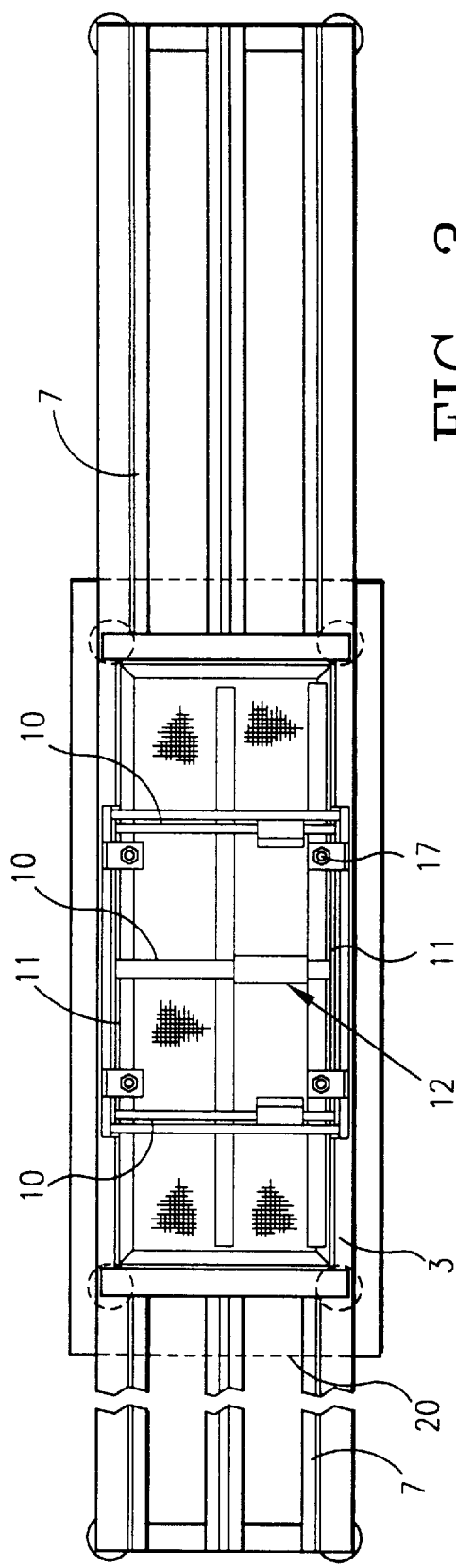
FIG. 3 shows a plan view of the first embodiment.

In order to achieve relative horizontal movement between the products held in cages 4 and the jets of water emanating from the nozzles 9, the manifold 8 is mounted for limited longitudinal and lateral movement. The water supply mechanism 6 is supported for lateral movement across the apparatus on three lateral shafts 10 provided between frame members 11 of the centre frame 5, as shown in FIGS. 2 and 3. The movement is controlled by attaching a pneumatically driven piston/cylinder arrangement 12 between the water supply mechanism 6 and the frame members 11. The piston/cylinder arrangement 12 can thus be operated to move the water supply mechanism 6, and thus the manifold 8, across the apparatus as required.

A similar arrangement is used to move the manifold 8 longitudinally of the apparatus. The water supply mechanism 6 has a longitudinal plate member 13 which is supported by the lateral shafts 10 and from which a pair of longitudinally spaced brackets 50 depend. A pneumatically driven piston/cylinder arrangement 14 extends between the brackets and carries the manifold 8 for longitudinal movement on the water supply mechanism 6.

Alternative arrangements for creating the required movement of the manifold, such as rack and pinion or worm screw devices, may be employed. The relative movement of the cages 4 and nozzles 9 need not result from movement merely of the manifold. The nozzles may be kept stationary and the cages moved, or both may be moved.

A height adjustment mechanism 35 is provided at the top of centre frame 5. This includes threaded bolts 17 rotation of which causes vertical movement of frame members 11 relative to the main body of the centre frame 5. Thus the height of the water supply mechanism is adjustable, whereby the pressure and the area covered by the jets on contact with the products can be altered. The pressure of the jets may be altered at the pressure source, which may be a pump (not shown).

As shown in FIGS. 1 and 2, a splash plate 18 is positioned below the cages 4 and faces the nozzles 9. It acts to redirect water which has passed through the cages back at the products. The water redirected in this manner results in a secondary skinning action of the products helping to ensure a high efficiency of the process. The splash plate is preferably positioned at a slight incline, such that skins that have been removed can drain away. The splash plate may be grooved or have ridges or apertures or other suitable configurations in order to assist such drainage.

A collecting chamber 19 is located below the product processing area 40 to receive the water and removed skins from the splash plate 18. The collecting chamber has an outlet 36.

A cover 20 encloses the processing area 40 of the apparatus, ensuring safe and clean operating conditions around the machine. The cover is readily removable for easy maintenance of the working parts of the apparatus and may be formed entirely of hardened glass or plastics or of other suitable materials with perhaps viewing ports.

The use of the apparatus according to the first embodiment will now be described. Each cage 4 is filled, by any suitable method, to approximately two thirds (67%) of its capacity by volume. The trays 30 are then slid into the processing area 40 below the 30 array of nozzles 9. With the trays in position, the lid 15 is lowered into position by operation of the pistons 16. Water is sprayed under pressure directly at the products, whilst at the same time the manifold 8 is moved laterally and longitudinally by operation of the respective piston/cylinder arrangements 12 and 14. Any suitable liquid may be used, although the availability and low cost of water makes it a good choice.

The action of the pressurised water directly loosens and/or removes the skins from the products whilst in addition creating movement of the products allowing their skins to escape through the apertures in the cages 4. The movement of the manifold 8 is such as to direct the nozzles' jets along a path whereby substantially all the products are acted upon by the pressurised water. The path followed by the nozzles may be adjusted to suit requirements. The water may be pressurised at a pressure in the range of 35 psi to 5000 psi, depending on the product being processed.

In a trial of the process according to a preferred embodiment, a cage made of stainless steel spot welded 22 gauge mesh ¼, by ¼ inch nominal spacing and having overall dimensions 1.5 inches deep by 3 inches wide by 7 inches long was filled two thirds full (i.e. to a depth of 1 inch) with unskinned hazelnuts. A pump generating a pressure of approximately 1500 psi supplied a single nozzle with water to generate a 15° flat spray. The flow rate was approximately 8 liters per minute. The nozzle was located at a spacing of 1¾ inches from the top level of the body of hazelnuts (when static) and directed downwardly whilst being moved in a horizontal plane to cover substantially the entire surface area of the cage. The result was that 99% of the hazelnuts were skinned completely after 90 seconds of spraying.

In use of the first embodiment, the abrasion between the products agitated by the jet or jets has an effect in the skin removal process. In general, the process is inefficient if too few products are enclosed by the receiving means because of reduced throughput volumes and reduced product-to-product abrasion, whilst it is also inefficient if too many products are enclosed because of the restricted movement of the products. Preferably the volume occupied by the products in a receiving means is in the range of 20% to 80% of the total volume of the receiving means, more preferably 50% to 75%. Abrasion between the products and the walls of the receiving means also has an effect in the skin removal process.

A second embodiment of the apparatus is shown in FIGS. 5 to 10. Parts of the apparatus which correspond to parts in the first embodiment are indicated by the same number as in the description of the first embodiment, increased by 100.

The second apparatus is generally similar to the first, in that it comprises a main frame 101 supported on legs 102, with the frame carrying the product receiving means and a water supply mechanism 106 being disposed above the product receiving means. However, it differs with regard to (inter alia) the receiving means 150 and the nozzles 109.

Figure 5:
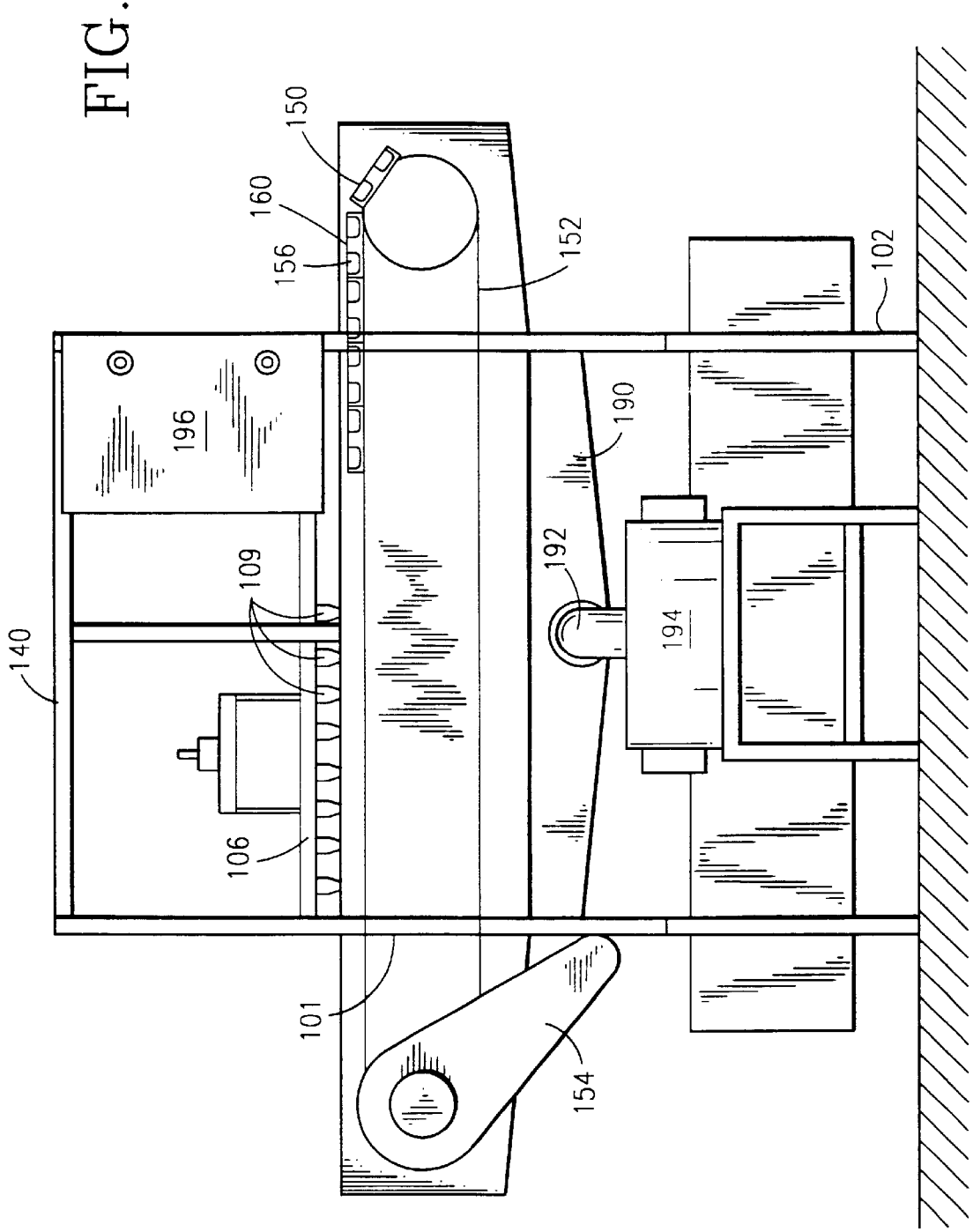
FIG. 5 shows a front elevation of apparatus in accordance with a second embodiment of the present invention.
Figure 6:
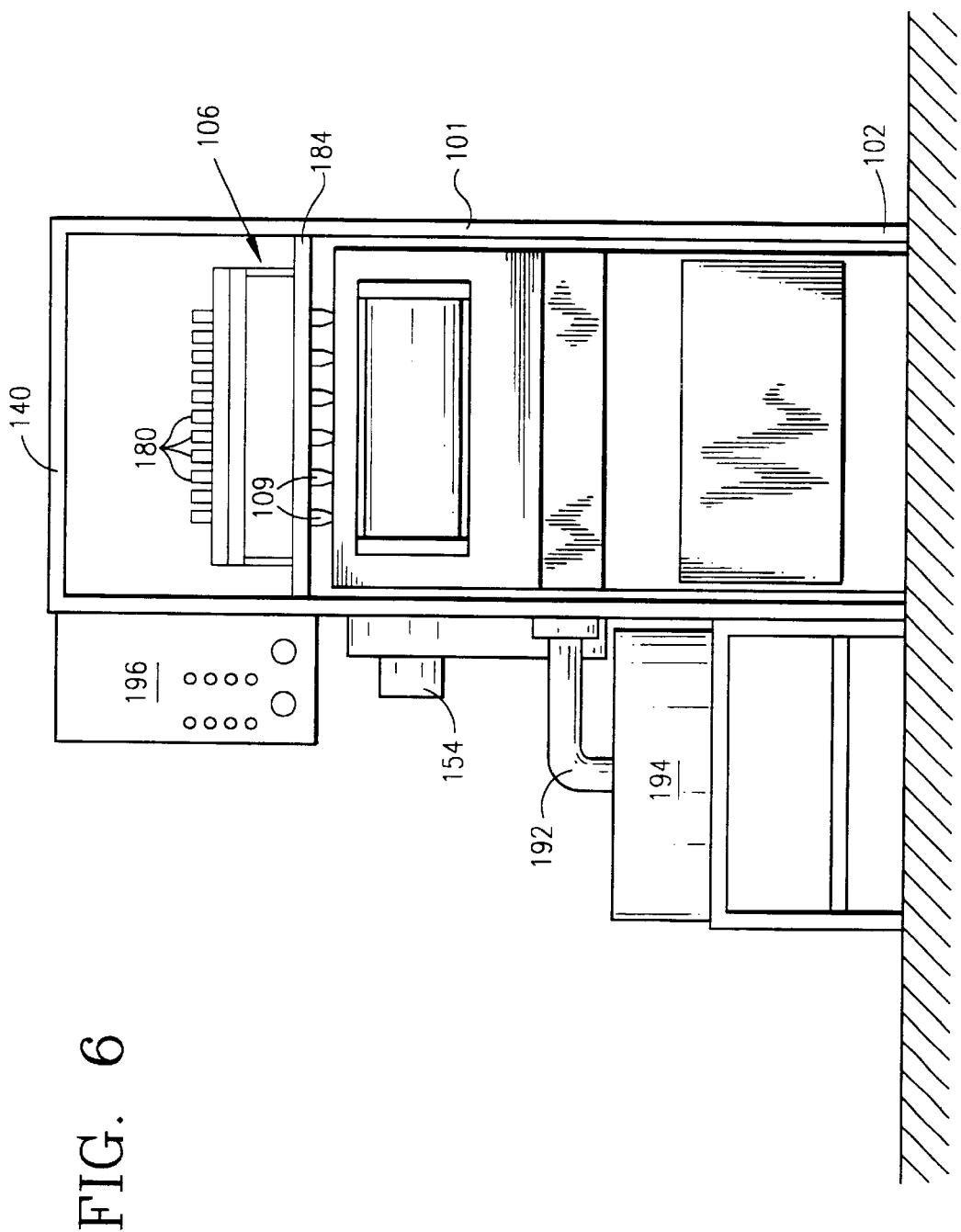
FIG. 6 shows an end elevation of the second embodiment.

As is most clearly visible from FIG. 5, the product receiving means in the form of product carriers 150 in the second embodiment are arranged on an endless conveyor chain 152. The conveyor chain loops around two pulleys and follows a forward, upwardly facing path and a return, downwardly facing path. The chain is driven by a drive assembly 154. The receiving means are only shown at one end of the chain for clarity purposes.

Figure 11:
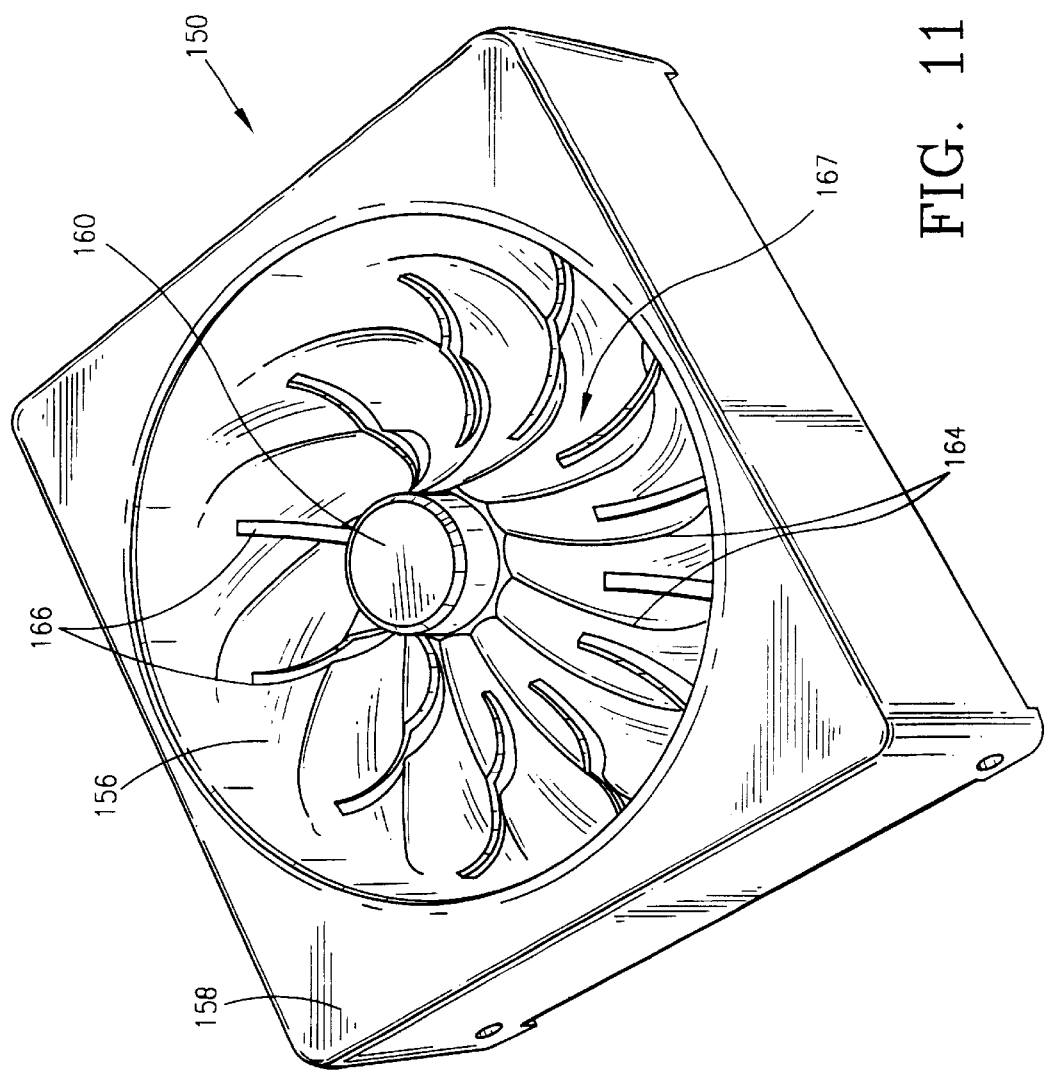
FIG. 11 shows a perspective view of a product receiving means for use with the second embodiment.
Figure 12:
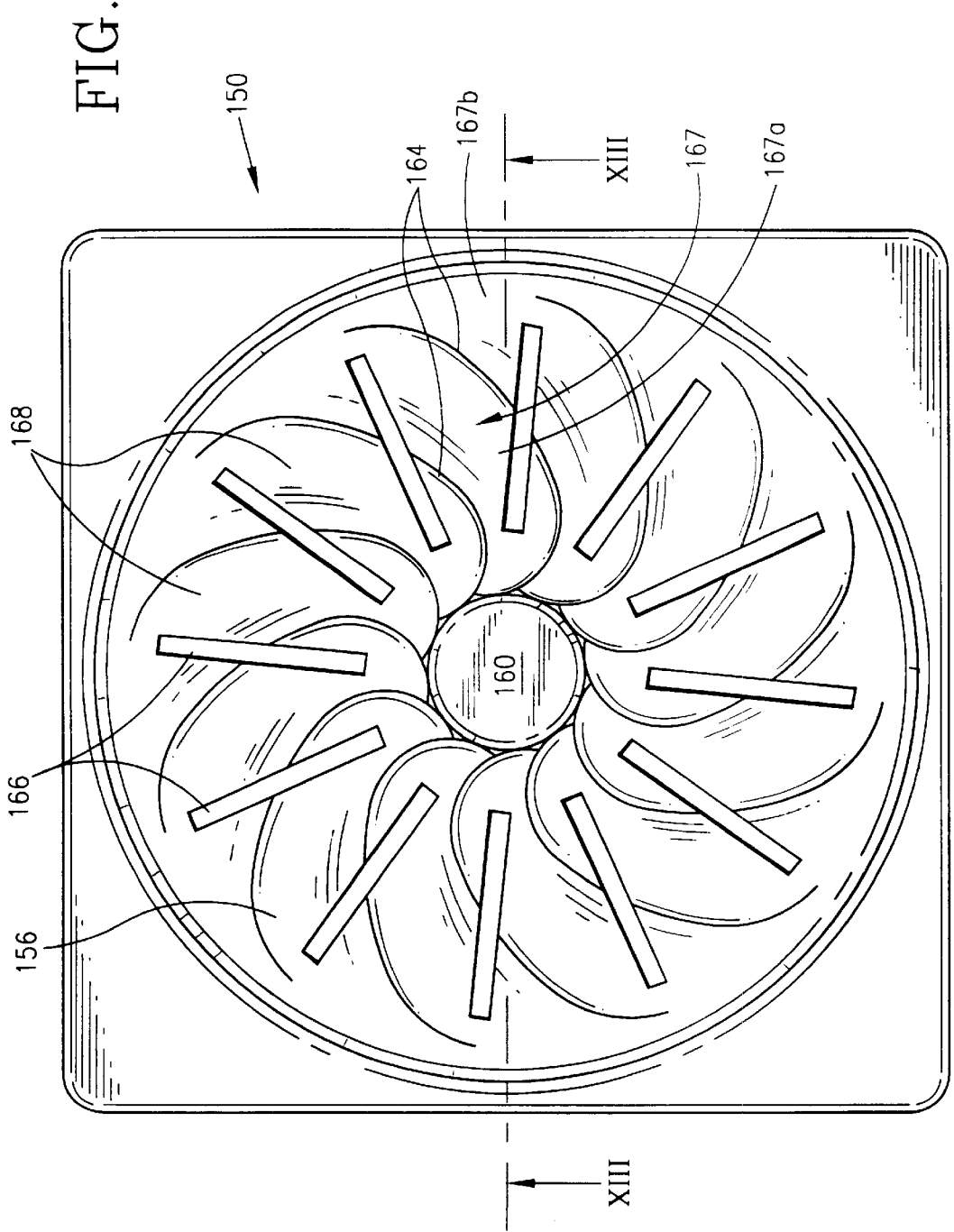
FIG. 12 shows a plan view of the product receiving means of FIG. 11.
Figure 13:
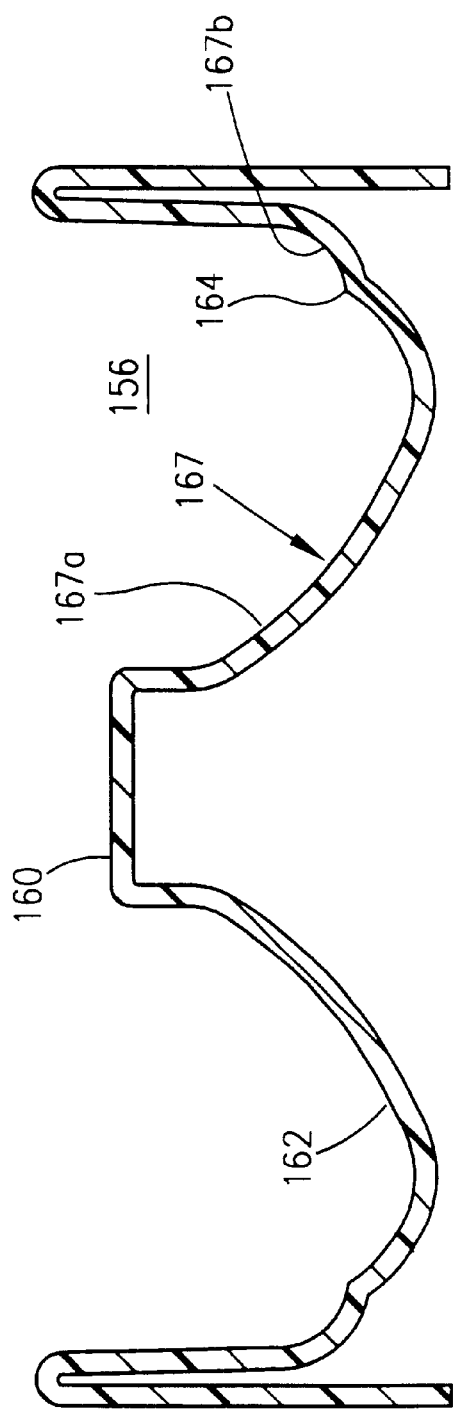
FIG. 13 shows a cross-section taken along line XIII—XIII in FIG. 12.

As can be seen from FIGS. 11 to 13, each of the product carriers 150 is in the form of a generally cuboid block, having an annular recess 156 in its upper surface 158 which serves to receive the products. There is an upstanding central region 160 serving to define the radially inner wall of the annular recess 156. The recess and the upstanding central region can also be seen in FIGS. 5 and 7.

Figure 10:
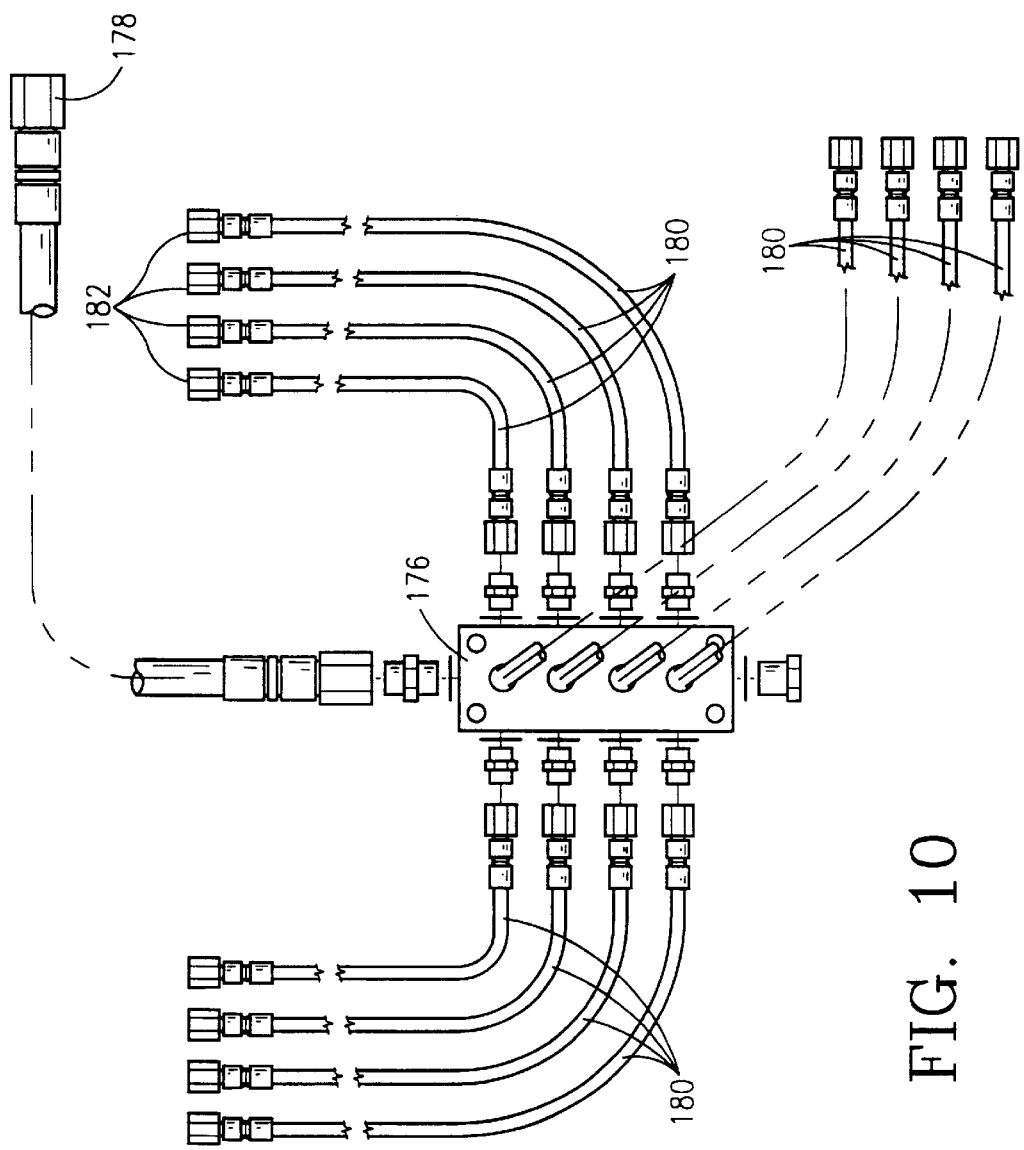
FIG. 10 is a schematic view of the water manifold of the second embodiment.

In cross-section, the shape of the recess 156 is generally U-shaped, as shown in FIG. 10. The lower surface 162 of the recess 156 is formed with raised ridges 164, which extend from the radially inner wall of the annular recess to its radially outer wall. These ridges 164 do not extend radially, but are curved so that their central regions are circumferentially offset from each of their ends. A channel 167 is defined between each pair of adjacent ridges. Each channel has a channel portion 167a which slopes downwardly from the radially inner wall to the lowermost region 168 of the channel (and of the carrier), and a channel portion 167b which slopes downwardly from the radially outer wall to the lowermost region 168. The purpose of the ridges and channels will be described in detail later.

Radial slots 166 are formed in the lower surface 162 of the recess 156, to allow liquid in the recess 156 to drain out. As will be seen from FIG. 9, there are twelve ridges 164, twelve channels 167 and twelve slots 166, and each of the slots 166 extends between two adjacent channels 167 and intersects with a ridge 164. It will be noted that the lowermost region 168 of each channel is disposed about halfway between two radially adjacent slots 166, so that liquid will tend to be retained in the part of the channel between the slots.

The carriers 150 are formed from a robust plastics material, preferably polycarbonate, and are preferably formed by moulding. The slots 166 can be formed in the moulding process, or machined into the carriers 150 after moulding. The upper edges of the slots are preferably radiused or chamfered to avoid sharp edges which could damage the products.

Above the conveyor chain is the water supply mechanism 106. As in the first embodiment, it is enclosed by a cover 140. Further, it may be provided with means to adjust its height above the conveyor chain, in a similar manner to the first embodiment.

Figure 7:
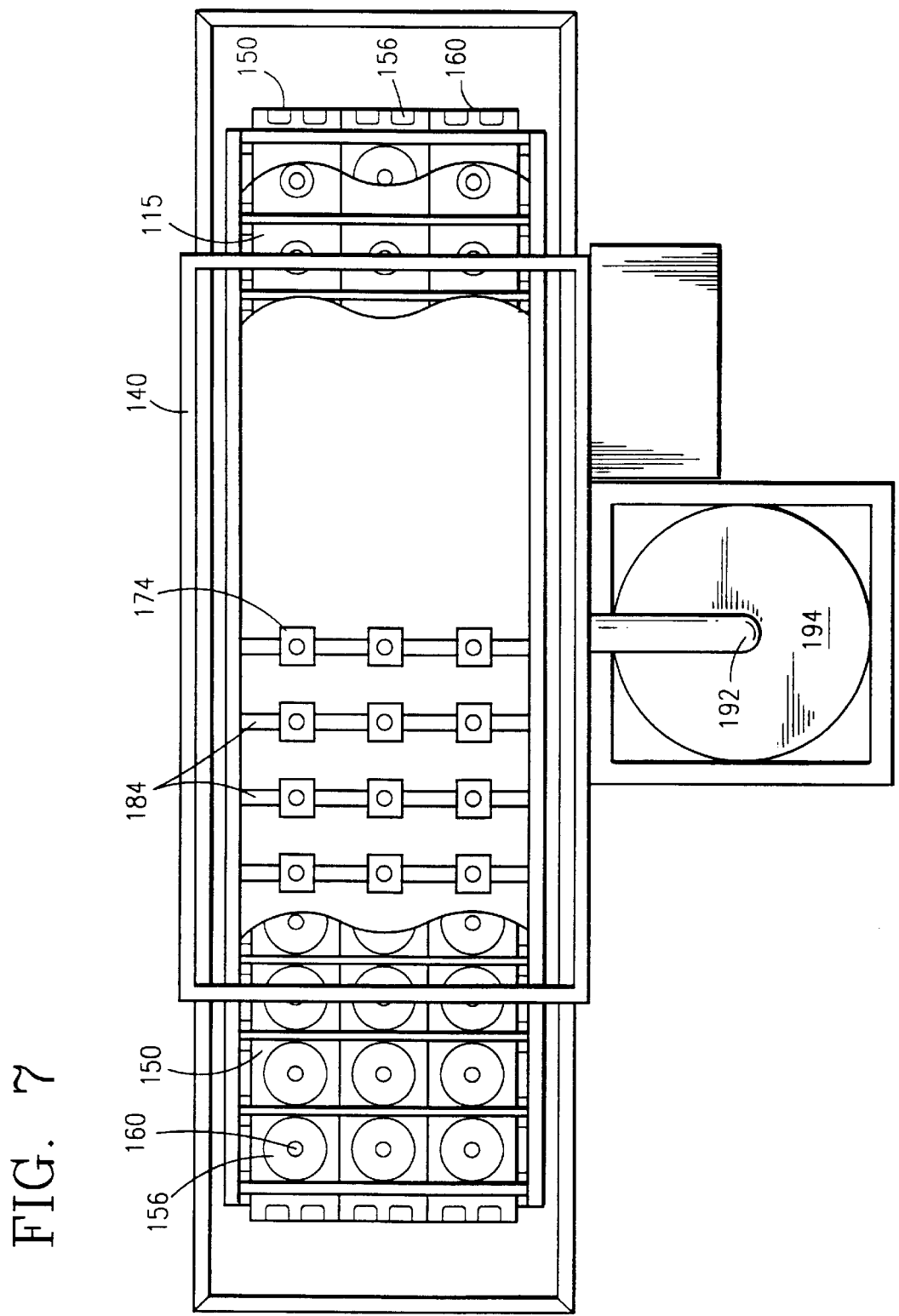
FIG. 7 shows a plan view of the second embodiment.

As shown in FIG. 7, the carriers 150 are arranged three abreast on the chain 152. The water supply mechanism 106 has twelve pairs of nozzles 109, arranged in a four-by-three array. The mechanism is arranged such that a pair of nozzles 109 co-operates with a single carrier 150. Thus, the products received in twelve of the carriers 150 (or four rows of carriers) can be processed at one time.

Figure 8:
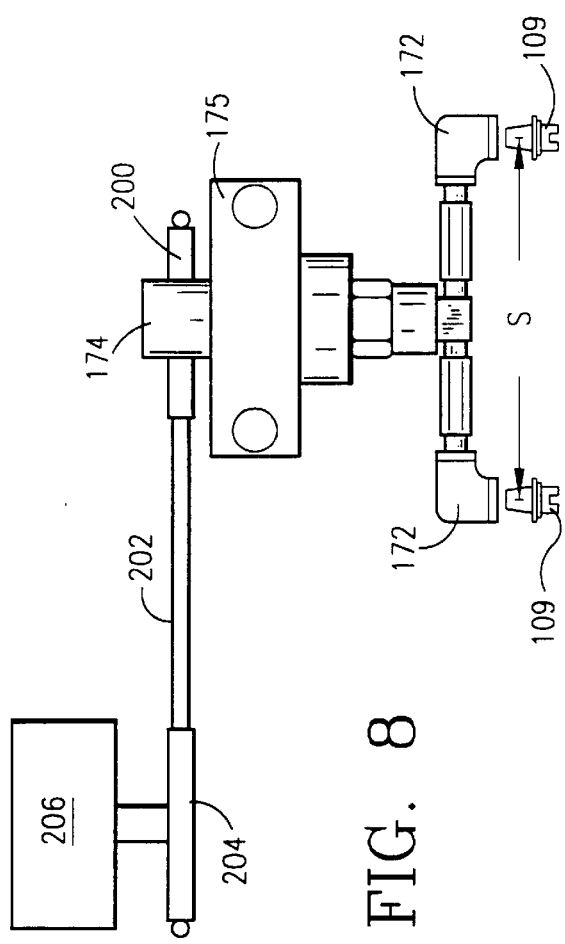
FIG. 8 shows an elevation view, partly exploded and partly in section, of a pair of nozzles of the water supply mechanism of the second embodiment, together with a drive arrangement.

As is more clearly shown in FIG. 8, each pair of nozzles is arranged with the nozzles 109 at either end of a support bar 170. The support bar is hollow and the nozzles 109 are in communication with the inside of the support bar 170 via elbow joints 172, such that water supplied inside the support bar 170 will emerge from the nozzles 109. Each support bar 170 is connected at its midpoint to a rotary joint 174, and water is supplied through this rotary joint 174 into the inside of the support bar 170.

Each of the twelve rotary joints 174 is connected to a single water manifold 176, shown schematically in FIG. 10. The manifold is supplied with water via pipe 178. Twelve separate supply tubes 180 lead from the manifold, and each supply tube has a connector 182 at the end distant from the manifold 176, allowing the supply tube to be connected to a respective rotary joint 174. The manifold allows a single supply of water to be led through each of the twelve rotary joints 174 and hollow bars 170 to each of the twenty-four nozzles 109. The ends of the twelve supply tubes 180 can be seen in FIG. 6.

The horizontal separation s of the nozzles 109 in each pair is such that each nozzle will be positioned above the annular recess 156 in the carrier 150 about two thirds of the distance from its inner radial wall to its outer radial wall. As a result, when the support bar 170 rotates, the nozzles 109 follow a circular path above the lowermost regions 168 of the annular recess 156.

Figure 9:
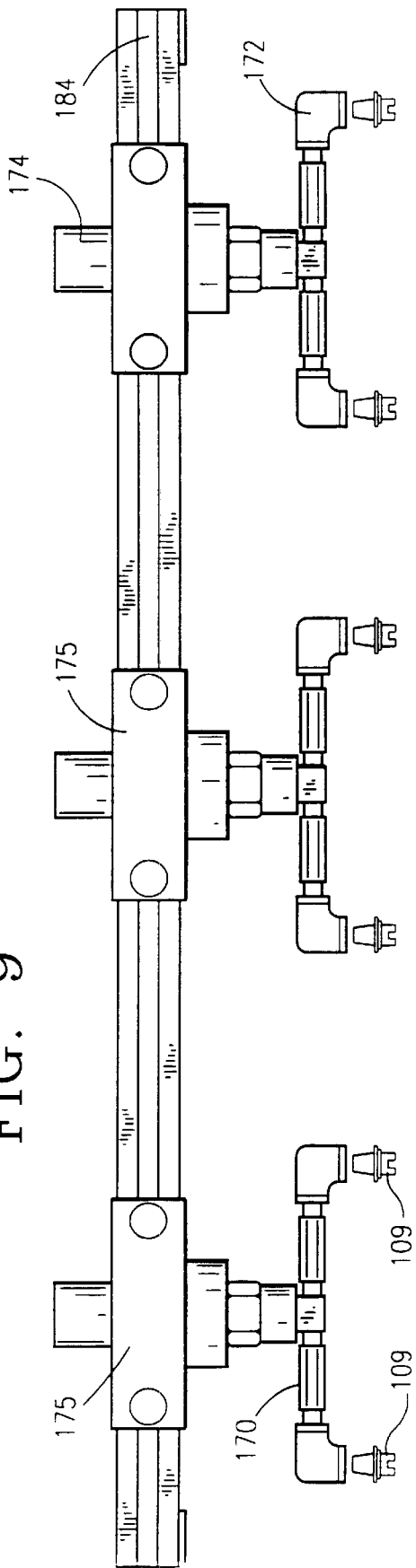
FIG. 9 shows a row of three pairs of nozzles.

In order to position each pair of nozzles 109 above the recess 156 of their respective carrier 150, the pairs of nozzles are attached to members 184 extending above the carriers 150. There are four such members 184, each one carrying three pairs of nozzles 109, as shown in FIG. 9. The nozzles 109 point generally downwardly, but are offset from the vertical by around 9°.

Each pair of nozzles 109 is driven to rotate above the recess of their respective carrier 150. This is achieved by having each of the rotary joints 174 mounted on the members 184 by means of bearings 175, in such a manner that they are free to rotate.

The arrangement for driving one of the rotary joints is shown in FIG. 8. The rotary joint 174 carries a pulley 200, which engages with a belt 202. The belt 202 also engages with a drive pulley 204, which is driven to rotate by an electric motor 206. When the drive pulley 204 is driven by the motor 206, the rotational movement is transmitted to the pulley 200 by the belt drive, and as a result the rotary joint rotates 174. Since the pair of nozzles 109 is attached to the rotary joint 174, this also rotates.

The rotational speed of the pair of nozzles 109 can be varied, depending on the products to be skinned. However, a speed of 2000 rpm is suitable for most products. The speed can be varied by simply varying the speed of rotation of the electric motor 206.

A single electric motor can drive a plurality of pairs of nozzles. Alternatively, if desired, each pair of nozzles can be driven independently by a dedicated motor. As the nozzles 109 rotate, the jets of water are directed against the products around the entire circumference of the recess 156. Further, because the water impacting on the products has a horizontal component of velocity (resulting from the angle of the nozzle 109 and the rotation of the nozzle bar 170), the water tends to make the products move circumferentially around the recess 156. Moreover, the shape of the channels promotes circumferential flow. The nozzles rotate anticlockwise and the water and products rotate clockwise. In order to help the movement of the products around the recess, it is preferred that the rate of discharge of water into the recess and the rate at which water drains from the recess are such that a certain level of water is maintained in the recess, as this has the effect of "fluidizing" the products.

As the products move around the recess 156, they ride up and over the raised ridges 164 in the lower surface 162 of the recess 156. The ridges provide upwardly sloping surfaces, thus ensuring that products which were towards the bottom of the recess 156, and thus not impacted directly by the water jets, will move upwards towards a position where the jets can impact directly.

The water from the jets drains from the carriers 150 through the slots 164. In addition, as the skin removed from the products tends to be in the form of flat sheets, it can also pass through the narrow slots 164. However, the slots 164 are dimensioned such that they are too narrow to allow products (skinned or otherwise) to pass through. During the process, it is possible for nuts and the like to be broken in half, and in order to avoid any of these broken halves from passing through the slots 164, it is preferred that the slots 164 have an appropriately selected maximum width. In the case of hazelnuts, for example, the maximum width is around 0.1 inches (2.5 mm).

Unlike the first embodiment, there is no splash plate provided beneath the carriers. Instead, water simply drains into a collector 190. It is possible to discard the water. However, it is preferred that the water be passed through pipe 192 to a filter apparatus 194, where it is filtered to remove skins and so on and re-used, as this enables the machine to be used in areas where water is more valuable. Over a period of time, the temperature of the water tends to increase as a result of its passage through the nozzles 109, and as warm water can lead to problems with bacteriological contamination, a cooling apparatus can be provided to cool the water. In some cases, the temperature increase can be of the order of 10° C. However, if the temperature of the water is sufficiently low even after it has passed through the nozzles 109, the cooling apparatus can be dispensed with.

As in the first embodiment, a lid 115 is provided (see FIG. 7) to reduce the chance of products being ejected from the carriers 150 as a result of impact by the water jets. The lid is formed from a wire mesh, to allow the water jets to pass through. The spacing of the mesh needs to be a compromise between being as narrow as possible, to reduce the chance of losing product, and as wide as possible, to reduce the energy loss undergone by the jets as they pass through the mesh. A spacing of between ⅜" and ½" is used, and this gives satisfactory results.

The operation of the apparatus of the second embodiment will now be described.

Products are filled into the carriers 150 at one end of the upper run of the conveyor chain 152. This can be done by hand or by means of an automated filler. As the carriers 150 are mounted on a conveyor chain 152, the filling need only take place at one longitudinal position along the conveyor chain, with the carriers 150 being carried along beneath this position. The carriers 150 are filled to around two thirds capacity, as in the first embodiment.

Movement of the conveyor chain 152 then positions twelve of the carriers 150, filled with product, beneath the nozzle array, such that each pair of nozzles 109 is arranged above the recess 156 in one of the carriers 150. Water is supplied to the manifold assembly 176, passes through the supply tubes 180, the rotary joints 174, the hollow bars 170, and into the nozzles 109, and is directed generally downwardly onto the products. At the same time, the electric motor 206 is driven to cause the nozzle support bars 170 to rotate, as described above.

The rotating jets are directed at the products, causing them to move in the recesses 156 of the carriers 150 and "tumble" up and over the ridges 164. The jets impacting on the products, at the upper region of the agitated body thereof, leads to efficient loosening or removal of skin from the products. The water from the jets drains through the slots 166 in the lower surfaces 162 of the recesses 156, carrying the removed skin away with it. Water is retained in the carrier up to a level of about one third of its depth.

After a predetermined time, the water supply is discontinued, and the conveyor chain 152 is moved. This moves the carriers 150 containing the processed products from beneath the nozzles 109, and replaces them with carriers 150 which have just been filled with unskinned products. The carriers 150 containing the processed products are carried over the edge of the conveyor, and tip the processed products into a hopper or the like.

It is possible for the process to be carried out automatically, for example under computer control. Alternatively, the motion of the chain and the supply of water to the nozzles 109 may be carried out manually, and a control panel 196 may be provided for an operator.

In an experiment with the second embodiment, 300 grammes of Turkish hazelnuts in a carrier 150 were sprayed by a pair of nozzles 109 at a pressure of 475 psi and a flow rate of 8 liters per nozzle per minute. They were sprayed for 45 seconds and very good skinning results were obtained. In another experiment Oregon hazelnuts were used with the same parameters and were sprayed for 85 seconds to achieve very good skinning results.

In both the above experiments, it was found that there was a minimal ingress of water during the skinning process. By minimising water ingress during the process, the subsequent dehumidifying time is reduced. Depending on the natural moisture content of the hazelnut—normally between 4.5% and 7.5%—the moisture content will generally increase by a relatively small amount, for example up to 1%, during the skinning process carried out by the preferred embodiments of the invention. For reasons of ensuring a good shelf life and so as to retain the nut's natural characteristics the overall moisture content should be reduced to about 2.5%. With a low ingress of water during the skinning process, less time is taken to reduce the moisture content to the desired 2.5%. There are thus savings in time and energy.

Figure 14:
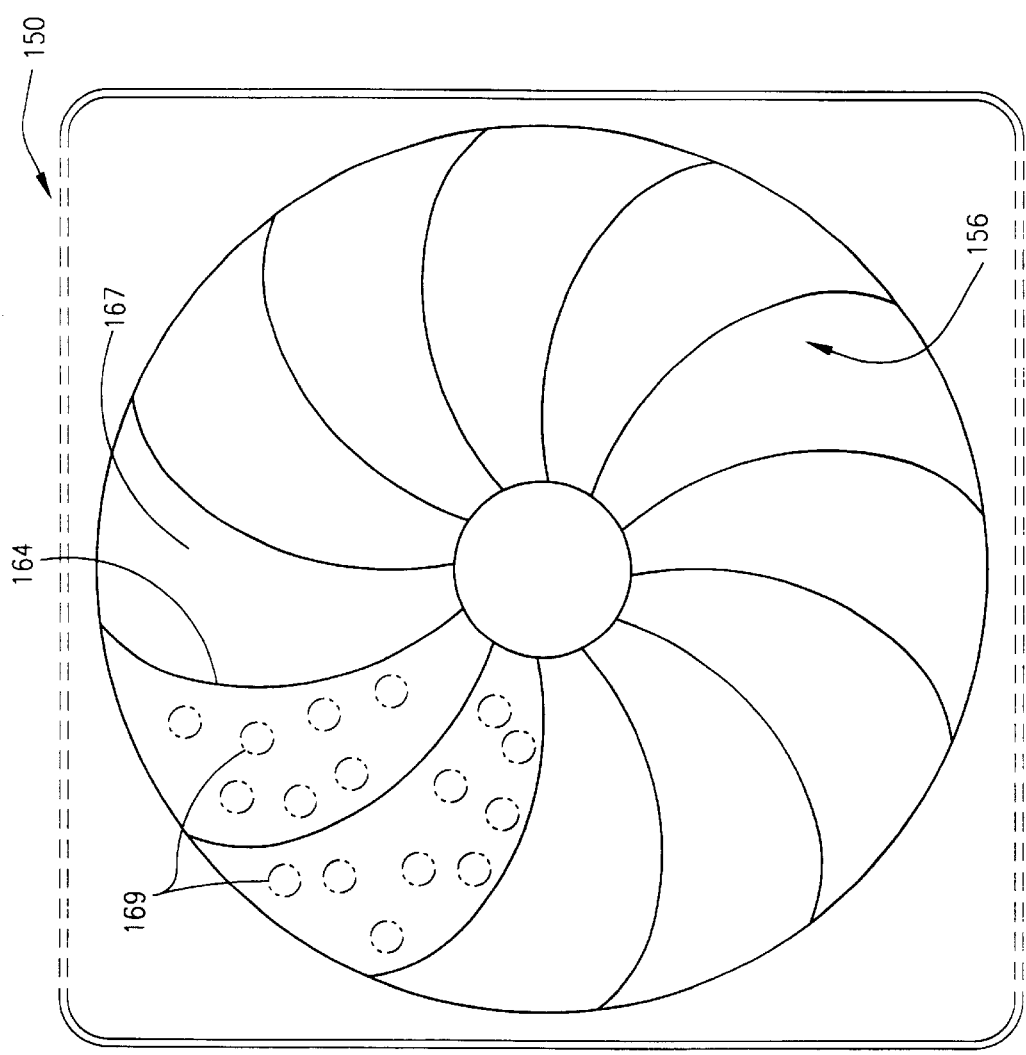
FIG. 14 shows a plan view of a modified form of product receiving means.

A modified form of product carrier 150 is shown in FIG. 14. This corresponds generally to the product carrier of FIGS. 11 to 13, with the main difference being that the radial slots 166 are replaced by round openings 169. These have chamfered top edges. Although only two of the channels 167 are shown formed with openings, they are in fact distributed throughout the floor of the recess 156.

The embodiment of FIG. 14 has the advantage that none of the openings pass through the ridges 164, and thus do not create sharp points or edges at the ridges. There is therefore a reduced tendency to break, pit or otherwise damage the products during processing. When used to process hazelnuts, for example, the openings 169 may have a diameter of 0.24 inches (6 mm).

The process according to the preferred embodiments of the present invention, at least applied to hazelnuts, thus achieves products which are reliably and efficiently skinned without the use of pre-treatment processes or processes for separating the skinned products and their skins.

For many products, the process of the invention can effectively remove the product skins with no pretreatment step and no post-treatment skin removal step. In some cases, however, the invention may enable a beneficial modification of a pre- or post-treatment step, or an elimination of just one of these steps. This can lead to savings in time or energy and indeed leading to an improvement in quality.

For example, a conventional process for skinning almonds involves scalding them for about 2 minutes in very hot water, so as to loosen the skins, and then pinching the almonds between two contra-rotating rollers to remove the skins. The scalding process can lead to a large increase in moisture content, for example of the order of 20–25%, and of course this must be later reduced in a drying step. It will be appreciated that by substituting the process of the present invention for the scalding process, the almond skins can be loosened or removed with a reduced ingress of moisture, with savings in time and energy during a drying step. Even if the scalding time is reduced (rather than eliminated), say to 10 seconds, this will reduce the moisture ingress and lead to savings.

If in the above example the process of the present invention results in loosening but not complete removal of the skins, there is still the advantage of a reduction in moisture ingress as compared to the normal scalding step. Following loosening, conventional pinch rollers can for example be used to effect removal. Moreover, if the objective is only to loosen the skins, rather than remove them, the process of the present invention could be carried out for shorter periods or at reduced liquid pressures.

The process of the present invention may if desired be carried out on certain products using heated liquid (e.g. water), for example if there is a benefit in reduced processing time and hence reduced moisture content. It is however generally preferred to use liquid at ambient temperature, at least initially, before passage of the liquid through the liquid discharge means has raised its temperature.

What is claimed is:

1. Apparatus for removing the skin from products such as nut kernels, beans, seeds or the like, comprising a receiver arranged to receive and hold a plurality of the products in a body thereof with the products in contact with each other, the receiver having a liquid outlet, and a liquid discharge device adapted to direct a jet or jets of liquid at the products held in the receiver so as to remove their skins, wherein the skins are removed by the liquid jets and contact of the products with each other, and the skins so removed from the products are carried away from the skinned products by said liquid and via an outlet of the receiver.

2. Apparatus as claimed in claim 1, wherein the spacing between the liquid discharge device jet or jets of liquid and the body of the products is adjustable.

3. Apparatus as claimed in claim 1, wherein the receiver is movable from a product loading station to a skin removal station, the receiver being open-topped at the product loading station and including a lid for the receiver located at the skin removal station.

4. Apparatus as claimed in claim 3, wherein the receiver is mounted on an endless chain.

5. Apparatus for removing the skin from products such as nut kernels, beans, seeds or the like, comprising a receiver arranged to receive and hold a plurality of the products in a body thereof with the products in contact with each other, the receiver having a liquid outlet, and a liquid discharge device adapted to direct at least one jet of liquid at the products held in the receiver so as to remove their skins by the jet of liquid and contact of the products with each other, said receiver having an outlet arranged to carry away skins removed from the skinned products by said liquid.

6. Apparatus as claimed in claim 5, wherein the spacing between the at least one jet of liquid and the body of the products is adjustable.

7. Apparatus as claimed in claim 5, including a product loading station and a skin removal station, wherein the receiver is movable from the product loading station to the skin removal station, the receiver being open-topped at the product loading station and including a lid for the receiver located at the skin removal station.

* * * * *